United States Patent
Lungwitz et al.

(10) Patent No.: US 8,731,735 B2
(45) Date of Patent: May 20, 2014

(54) METHOD FOR SELECTING ELEMENTS IN A DRIVER INFORMATION SYSTEM OR IN A NAVIGATION SYSTEM OR IN A MOBILE TERMINAL

(75) Inventors: Thomas Lungwitz, Stuttgart (DE);
Stefan Lueer, Hildesheim (DE);
Dietmar Schloegl, Sibbesse (DE);
Ulrich Kersken, Diekholzen (DE);
Horst Wettstein, Karlsruhe (DE); Ute Weittstein, legal representative, Karlsruhe (DE); Thomas Guelzow, Korntal-Muenchingen (DE); Thomas Kleine-Besten, Braunschweig (DE)

(73) Assignee: Robert Bosch GmbH, Stuttgart (DE)

( * ) Notice: Subject to any disclaimer, the term of this patent is extended or adjusted under 35 U.S.C. 154(b) by 1501 days.

(21) Appl. No.: 11/918,587

(22) PCT Filed: Apr. 5, 2006

(86) PCT No.: PCT/EP2006/061341
§ 371 (c)(1),
(2), (4) Date: Aug. 13, 2009

(87) PCT Pub. No.: WO2006/111471
PCT Pub. Date: Oct. 26, 2006

(65) Prior Publication Data
US 2009/0326794 A1    Dec. 31, 2009

(30) Foreign Application Priority Data

Apr. 21, 2005 (DE) .......... 10 2005 018 467

(51) Int. Cl.
*G06F 3/00* (2006.01)
*G06F 17/00* (2006.01)
*G06F 3/023* (2006.01)
*G06F 19/00* (2011.01)

(52) U.S. Cl.
USPC .......... 701/1; 701/409; 701/487; 340/995.16; 715/700; 715/708

(58) Field of Classification Search
USPC ........ 701/35, 36, 200, 208, 1, 29.1, 400, 409, 701/424, 425, 426, 461, 467, 487; 340/995.12, 995.14, 995.16, 995.18; 715/533, 700, 708
See application file for complete search history.

(56) References Cited

U.S. PATENT DOCUMENTS

| | | | |
|---|---|---|---|
| 5,072,395 A | 12/1991 | Bliss et al. | |
| 6,088,649 A * | 7/2000 | Kadaba et al. | 701/201 |
| 6,732,047 B1 * | 5/2004 | de Silva | 701/209 |
| 2002/0089529 A1 | 7/2002 | Robbin | |
| 2003/0069882 A1 | 4/2003 | Nieswand et al. | |
| 2004/0255248 A1 * | 12/2004 | Chang | 715/533 |

FOREIGN PATENT DOCUMENTS

| | | |
|---|---|---|
| EP | 1300776 | 4/2003 |
| EP | 1653378 | 5/2006 |

* cited by examiner

*Primary Examiner* — Thomas Tarcza
*Assistant Examiner* — Edward Pipala
(74) *Attorney, Agent, or Firm* — Kenyon & Kenyon LLP

(57) ABSTRACT

A method for destination selection in a navigation system in which each destination from a totality of all destinations is defined by destination parameters and a set of possible destinations from the totality of all destinations is limited stepwise due to the input of individual characters for one parameter. When inputting the characters, a switch may be made from one destination parameter to an input of a character for another parameter.

21 Claims, 1 Drawing Sheet

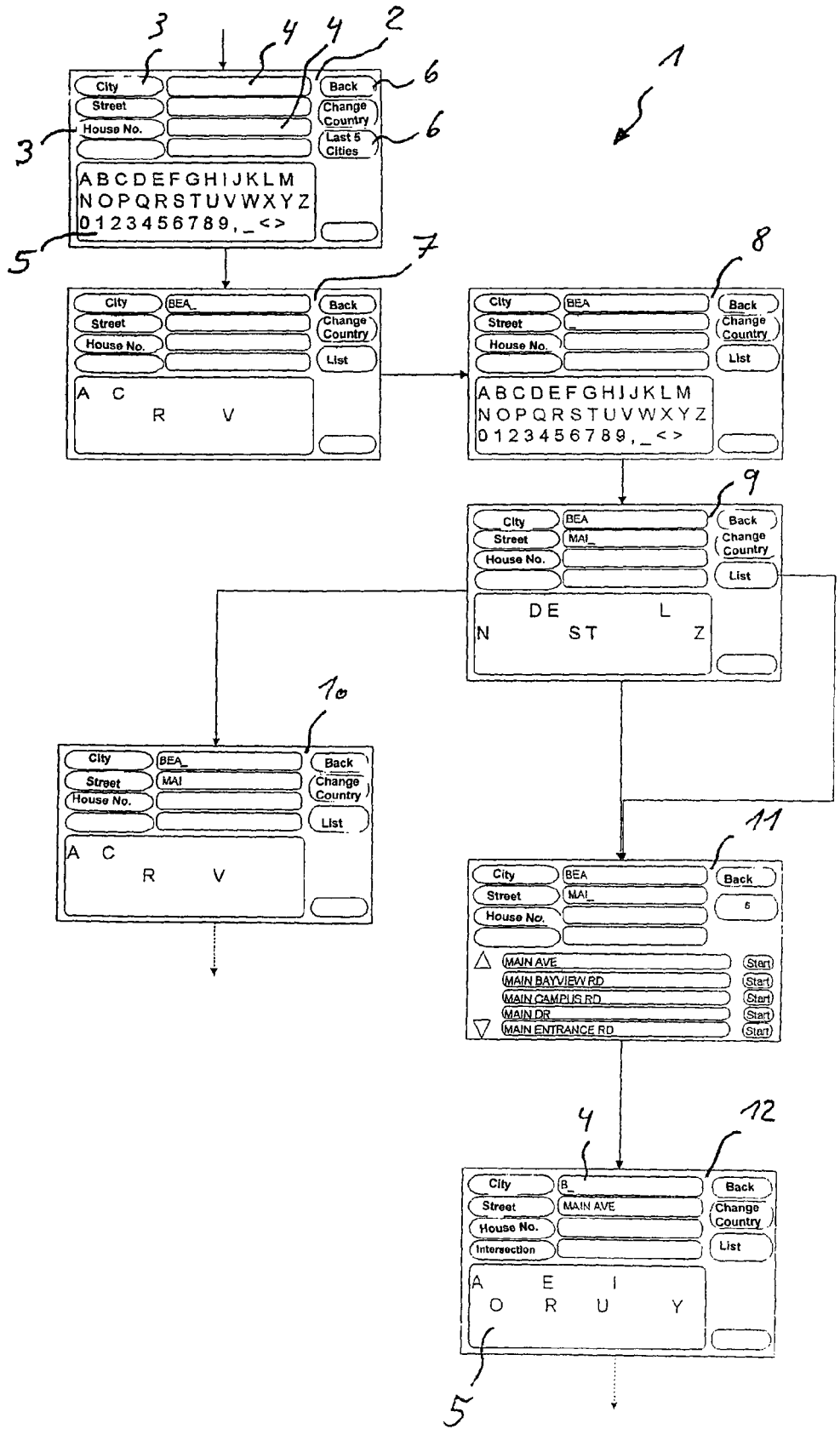

METHOD FOR SELECTING ELEMENTS IN A DRIVER INFORMATION SYSTEM OR IN A NAVIGATION SYSTEM OR IN A MOBILE TERMINAL

FIELD OF THE INVENTION

The present invention relates to a method for selecting elements in a driver information system or in a navigation system or in a mobile terminal in which each element is defined by parameters out of a totality of all elements and a set of the possible elements is limited step-wise by the input of individual characters for one parameter at a time. Examples for this method include the destination selection in a navigation system, or a song selection on an iPOD (a play-back device having a memory for compressed audio data, pieces of music in particular), or a smart phone.

BACKGROUND INFORMATION

Navigation systems for supporting the driver of a motor vehicle have become more and more common in recent years and are part of the standard equipment of a new motor vehicle in many cases. In order for a navigation system to be able to calculate a route, an initial point and an endpoint, i.e., starting point and destination of a travel route, must be established. The starting point may typically correspond to the current position of the vehicle and is determinable via an automated positioning system or the starting position may be input by the user of the navigation system. The destination is typically always input. A destination is input into the navigation system by the user with the aid of an input routine which is implemented in a piece of software. Among other things, the input routine must have the characteristics of unambiguousness, operability, and technical feasibility.

Information about the destination is expected from the user in selecting the destination. This information is referred to as destination parameters. Examples for destination parameters include the name of the country, the name of the state, the name of the city, the name of the city district, the name of the street, and the house number. Additional destination parameters could be the ZIP code, the area code, and/or the phone number of the end subscriber.

Not all destination parameters provided in a navigation system need to be known to the system in order to unambiguously select a destination. The destination parameters requested from the user are different in different countries and depend on country-specific peculiarities. The indication of city, street, and house number is typically sufficient in the Federal Republic of Germany. This corresponds to the postal address and the user is generally able to provide this information. Only in cases of ambiguity, when, for example, multiple cities in different areas have the same name, should the system detect this and request additional information from the user, such as the first numbers of the ZIP code or a name of a city-district.

This approach is successful in the Federal Republic of Germany due to the fact that postal addressing and political zoning always match. It is a different picture in the United States of America, for example. A discrepancy of postal and political names for one and the same locality may occur there or streets may extend under the same name and consecutive house numbers over several localities. These cases result in the fact that the user may not know the exact name of the city where the destination is located. However, the user is in the position to specify the name of the street and the house number.

A travel destination is typically selected manually via an input device using characters or via spelling by voice input. Real typing via keys or clicking on, i.e., selecting, graphic icons is often possible. All destination parameters are presented individually and consecutively; for example, the name of the locality is specified first, followed by the name of the street and the house number.

However, the user is guided most of the time to consider the allowed names in such a way that erroneous inputs are preferably avoided. This is achieved by providing, at some points, the appropriate still possible continuation characters. Free writing is thus replaced by selecting from a concurrent selection set. This character input approach is referred to as "automatic spelling function" (ASF).

In conventional input routines, the sequence of the destination parameters may be varied during input. However, it is necessary in these routines that one destination parameter must be input completely and unambiguously before the next destination parameter can be selected. Also, the sequence of the parameters is usually not freely selectable but is rather predefined by the input routine. Such input routines actually do not permit a free selection, but offer only a plurality of sequences of the destination parameter selection which, however, is fixedly predefined.

SUMMARY

It is an object of the present invention to provide an improved method for selecting an entry from a set of entries or for selecting an element from a set of elements, e.g., for selecting the destination in a navigation system, which enables the user to easily and rapidly input the parameters, the destination parameters in the case of the destination selection.

Information systems and databases increasingly have contents/terms which may be selected via input routines of the user-machine interface. These contents or elements are described by parameters and may be clearly identified from the totality of the terms by inputting the parameters. Moreover, there is a variety of mobile terminals on the market which may be used, for example, as music servers, video servers, or generally as memories for data sets such as addresses. In order for a mobile terminal to be able to play a song, for example, the song title must be input and, in the event of ambiguousness, also the interpreter. This may be done by selecting from a list or via a letter-by-letter input.

Examples of these contents/elements are
audio data files (for pieces of music: interpreter, title, composer, type of music, . . . ),
video data files,
data sets (destination memory, addresses, . . . ),
points of interest,
tourist guide information (campgrounds, museums, hotels, restaurants, historical buildings, or events, . . . ),
works of art (artist, name of the artwork, year of completion, era, genre, . . . ),
office (e-mails, files, . . . ),
shopping guide (bargain guide, factory outlets, . . . ),
yellow pages When inputting the characters, it is possible in a generic method according to the present invention to switch from one parameter to an input of a character for another parameter without the first parameter being unambiguous or having been input completely.

In accordance with an example method, the user may start inputting a parameter, regardless of whether previous inputs for other parameters have been completed or not. In the case of a destination input into a vehicle navigation system, for example, the user may input only a few first characters for the name of the city and the name of the street in order to select the destination. The example method according to the present invention has the great advantage that the user, if he doesn't know the exact spelling of a destination parameter, is able to reduce and limit the possible destinations by only partially inputting different destination parameters. It is thus possible for the user to feel his way step-by-step. The user is also not bound to a fixed input sequence of the destination parameters, but may rather select the sequence with which he is familiar from postal addresses or may start with the destination parameter which he reliably knows.

Furthermore, the object may be achieved by a driver information system or a navigation system or a mobile terminal for executing the method having an input device for inputting characters, a memory in which a totality of elements is stored, at least two parameters being assigned to the or a plurality of elements, and a controller which is designed in such a way that, when individual characters for one parameter are input, a set of the possible elements is limited step-wise from the totality of the elements and that it is possible, when characters for one parameter are input, to switch to an input of a character for another parameter, regardless of whether previous inputs for other parameters are completed or not.

Although the following description is mainly directed to the input of a destination into a navigation system, it does not mean, however, that the present invention is limited to this particular application. Moreover, the present invention is also applicable to other inputs into other devices, as already discussed.

Another advantage of the method according to the present invention is that, when addresses or points of interest are input, the input routine does not have to be adapted to national peculiarities each time the navigation area expands, thereby making a navigation system having an input routine which is independent of country-specific distinctions in addressing possible.

Due to alternation between multiple destination parameters as the characters are input, the number of input steps up to the unambiguous selection is preferably reduced. The reduction of the input steps utilizes the fact that locations and streets do not have a random relationship. Local geographic circumstances or locally outstanding personalities are frequently used as eponyms for streets. This results in the fact that many street names are found only in a few adjacent localities or, in the most favorable case, only in one single location.

For each destination parameter, there is preferably a selection set which is continuously adapted by inputting the characters. In addition, the limited selection sets of multiple destination parameters are linked to one another in such a way that limiting of the selection set of one destination parameter causes the selection sets of the other destination parameters to be limited as well.

Another advantage is that by taking into account the relationship between the destination parameters their compatibility is always guaranteed, i.e., no street names can be input, for example, which do not exist in a location that has been input.

An advantageous embodiment of the method according to the present invention provides that, after one character is input for one destination parameter, one or multiple subsequent characters are automatically complemented when there is unambiguousness for the name fraction. This is also true when, as a result of mutual limitation, local unambiguousness also occurs for other destination parameters.

It is furthermore preferred that, when the input of a character is canceled, the limitation of the selection set caused by the canceled character is also canceled. This makes it possible that potential input errors may be corrected in such a way that they have no effect on the continuation of the selection process. This cancellation also takes place for other destination parameters.

An advantageous refinement of the method according to the present invention provides that, in the event where the number of still possible destinations is less than a predefined value, these possible destinations are shown in a list on a display unit, for example. This enables the user to easily and rapidly make a final selection from a manageable number of possible destinations by making the selection directly from the list. It is practical to display all destination parameters in the case of input according to the present invention. If a group of destination parameters is selected which belong together, then the compatibility of the parameters is also ensured when the selection is made from the list.

Preferred destination parameters may be a name of a country, a city name, a street name, a house number, a ZIP code, a telephone area code and/or a phone number. Other possible destination parameters may be the indication of a federal state, the name of a city district, or the indication of a building function, e.g., town hall, city hall, pharmacy, or police headquarters. It is clear that the term "city name" includes all locations independent of the particular size.

An exemplary embodiment of the method according to the present invention is explained in greater detail in the following based on the appended drawing. The sole FIGURE shows a first input example based on a flow chart 1 for a display of a navigation system in which different input states of different destination parameters are shown. The input routine starts at display 2 in which no input has yet been made. In its left section, display 2 has fields 3 including available destination parameters listed one below the other. The city, the street, and the house number are provided as destination parameters in the shown example.

To the right of fields 3 of the destination parameters is a respective input panel 4 none of which shows an entry in display 2 as of yet. The position for which the system anticipates the input of a character is indicated by an underline, e.g., a blinking cursor, in one of input panels 4. A character panel 5 having a list of available characters for the next input at the cursor position is located below fields 3 of the destination parameters and input panels 4. Moreover, further control and function keys 6 are provided in display 2 for canceling the last input (back) or for selecting another country or another area (change country).

Display 7 shows an input status in which the first three letters "BEA" of the city have already been input. The list of the available characters is limited in such a way that only a meaningful additional character input for the city designation is possible.

In the situation shown in display 8, a switch has been made to the input of the destination parameter "street" which is apparent due to the changed cursor position. However, the input of the city is not yet totally and unambiguously completed, i.e., multiple destinations in different cities are still possible. The complete set of characters is again available to the user for inputting the first characters of the street name as is apparent in display 8 of the FIGURE.

Display 9 shows the input status in which the user has already limited the street by inputting the first three letters "MAI." Only certain characters which make a meaningful and permissible input possible are now available for further input.

For the further input status, the user may switch back to a more accurate specification of the city as is shown in display 10 by the changed cursor position. In the situation shown in display 9, the user may alternatively request the display of a list containing the possible and permissible street names by operating function panel 6 "list." This is shown on display 11 in which the permissible street names from which the intended street may be selected directly are listed one below the other.

If the number of elements of the possible destinations falls short of a threshold value dictated by the design of the system and the display, a list of the permissible and possible destinations may be shown to the user in a lower section of illustrated display 11 automatically, i.e., without a request via the operation of function panel 6.

After direct selection of the street name "MAIN AVE" in this example, the user has again changed the cursor position in input panel 4 for the destination parameter "city" in the situation shown in display 12. There he has additionally canceled or deleted the second and third letter of the input. All available characters for a permissible continuation of the input of the destination parameter "city" are now indicated to the user in character panel 5.

Additional examples for a destination selection are shown in the following tables. The representation using tables has the advantage that for all destination parameters the corresponding set of available characters may be exhibited in order to clearly show the possibilities of interaction. For the sake of simplicity, the following examples are limited only to the two destination parameters "location or city designation" and "street name."

Table 1 shows the selection of "Ostpreussenstrasse" in "Hildesheim" as an example. The individual input steps are indicated one below the other. Each input step indicates which character is input for which destination parameter. In addition, the character input carried out so far for each destination parameter is listed in each input step, and directly below this the characters available for further input are listed.

The first table row shows the state in which no input has taken place yet. Therefore, all characters for the destination parameter "city" and for the destination parameter "street" are selectable. Since street names in Germany may begin with numbers, numbers are permitted for the street. The letter "H" for the city is input in the first input step. This reduces the possible selection for the second letter of the street name to the vowels and the umlauts. The character selection for the street designation is reduced at the same time. The character selection is adapted due to the input of the additional letters "I" and "L" for the city.

In the following fourth input step, a switch is made to the input of the character "O" for the street. The character selection for the continuation of both destination parameters is clearly reduced due to the input of the second letter "S" for the street.

The next, sixth input step shows that a character chain for both destination parameters is complemented when the letter "K" is input for the street." Previous city input "HIL" turned into "HILDE" and street designation "OS" turned directly into "OSKAR-S" instead of "OSK." Moreover, the selectable characters for both destination parameters have been adapted to the new situation.

TABLE 1

|   |   |   |   |
|---|---|---|---|
|   |   | City: | |
|   |   | Selection: | ABCDEFGHIJKLMNOPQRSTUVWXYZÄÖÜ |
|   |   | Street: | '_123456789ABCDEFGHIJKLMNOPQRSTUVW |
|   |   | Selection: | XYZÄÖÜ |
| 1. | City: H | City: | H |
|   |   | Selection: | AEIOÄÖÜ |
|   |   | Street: | |
|   |   | Selection: | 1234ABCDEFGHIJKLMNOPQRSTUVWXYZÄÖÜ |
| 2. | City: I | City: | HI |
|   |   | Selection: | DLMNPRST |
|   |   | Street: | |
|   |   | Selection: | ABCDEFGHIJKLMNOPQRSTUVWXYZÖÜ |
| 3. | City: L | City: | HIL |
|   |   | Selection: | BCDGKLMPSTZ |
|   |   | Street: | |
|   |   | Selection: | ABCDEFGHIJKLMNOPQRSTUVWXYZÖÜ |
| 4. | Street: O | City: | HIL |
|   |   | Selection: | BCDGLMPSTZ |
|   |   | Street: | O |
|   |   | Selection: | BCDEHKLPRSTV |
| 5. | Street: S | City: | HIL |
|   |   | Selection: | CDGLT |
|   |   | Street: | OS |
|   |   | Selection: | KNT |
| 6. | Street: K | City: | HILDE |
|   |   | Selection: | RS |
|   |   | Street: | OSKAR-S |
|   |   | Selection: | CE |
| 7. | Street: < | City: | HIL |
|   |   | Selection: | CDGLT |
|   |   | Street: | OS |
|   |   | Selection: | KNT |
| 8. | Street: T | City: | HIL |
|   |   | Selection: | CDGLT |
|   |   | Street: | OST |
|   |   | Selection: | AEPRST |
| 9. | Street: P | City: | HILDESHEIM |
|   |   | Selection: | |
|   |   | Street: | OSTPREUSSENSTRASSE |
|   |   | Selection: | |

The character "<" in the seventh input step indicates a cancellation of the last input in the street designation. Letter "K" is thus canceled. The situation shown is again the same as after the fifth input step. The character chains, complemented in the sixth input step, have also been canceled for both destination parameters. The situation after the cancellation in the seventh input step is indistinguishable from the situation after the fifth input step. A renewed cancellation of a character input for the street would result in the situation that was reached after the fourth input step.

An unambiguous destination selection takes place via the eighth and ninth input step for complementing the street. The ninth input step automatically complements the missing character chains in both destination parameters up to the complete designation of the respective destination parameters.

Table 2 shows an example of the switch from character input to list selection. The example shown starts with an already input character chain for the destination parameter "street."

TABLE 2

|           | City:      |                   |
|-----------|------------|-------------------|
|           | Selection: | MW                |
|           | Street:    | KUDLICH           |
| Street: H | Selection: | _S                |
| Input: ?  | Selection: |                   |
|           | City:      | MEMMINGEN         |
|           | Street:    | KUDLICHSTRASSE    |
|           | City:      | MERLING           |
|           | Street:    | KUDLICHSTRASSE    |
|           | City:      | WÖLLSTADT         |
|           | Street:    | KUDLICH SIEDLUNG  |

After the character chain "KUDLICH" has already been input for the destination parameter "street," the street designation may be continued using a space character (indicated with an underline) or using the letter "S." The two letters "M" and "W" are available as initial letters of the name of the location for the destination parameter "city."

"Input:?" in the table indicates the switch to the list selection. For example, this switch may take place by the user executing an input and/or by pressing a key. An automatic switch to the list selection is probably more sensible when the number of possible destinations is less than a certain value. Among other things, this value may be determined as a function of the display size or of the presentability in the display. The listing may be designed in such a way that the compatible combinations of the parameters are displayed. For example, Table 2 shows the three pairs (Memmingen/Kudlichstrasse), (Merling/Kudlichstrasse), and (Wöllstadt/Kudlich Siedlung).

The selectivity of street names in Germany is greater than that of location designations, for example. Of about 300,000 different street names, approximately ⅔ can be found in only one city. Table 3 shows examples for the number of input steps for different addresses which indicate this difference in selectivity. But a switch between destination parameters during the input also causes a reduction in the number of required input steps until the destination is unambiguously established. This is also shown in Table 3.

TABLE 3

| | Input with interaction and type of input | | | | |
|---|---|---|---|---|---|
| Address | Input without interaction | Complete City-Street | Complete Street-City | Alternating City-Street | Alternating Street-City |
| Hildesheim Bahnhofsallee | 17 | 13 | 13 | 13 | 11 |
| Braunschweig Köterei | 15 | 8 | 7 | 7 | 7 |
| Pforzheim Bäznerstrasse | 9 | 8 | 4 | 6 | 5 |
| Creglingen Kieselallee | 11 | 8 | 8 | 7 | 6 |
| Bayreuth 99 Gärten | 8 | 7 | 2 | 2 | 2 |

Table 3 clearly shows the difference in the number of required input steps with or without interaction or linking of the destination parameters. Moreover, if a switch of the input to another destination parameter is additionally made possible, then the number of input steps may be further reduced.

What is claimed is:

1. A computer-implemented method for selecting elements via a mobile terminal, the method comprising:
    defining, via a processor, each element out of a totality of elements by a plurality of parameters;
    displaying, via the processor, a plurality of data fields on the mobile terminal, each data field corresponding to one parameter out of the plurality of parameters, each parameter being specified by a respective string of characters;
    inputting, via the processor, a first subset of characters of a first parameter in a first data field, the first subset having fewer characters than a full set of characters of the first parameter;
    while the first subset has fewer than the full set of characters of the first parameter, inputting, via the processor, a second subset of characters of a second parameter in a second data field, the second subset having fewer characters than a full set of characters of the second parameter;
    while inputting characters in the first and second data fields, selecting, via the processor, stepwise a set of candidate elements from the totality of elements based on the first and second subsets of input characters; and
    displaying, via the processor, prompts based on the set of candidate elements on the mobile terminal.

2. The method as recited in claim 1, wherein the mobile terminal is a driver information system.

3. The method as recited in claim 1, wherein the mobile terminal is a navigation system.

4. The method as recited in claim 1, wherein the user is not bound to a fixed input sequence.

5. The method as recited in claim 1, further comprising:
    using the method for song selection in a mobile music memory and play-back device or a smart phone.

6. The method as recited in claim 1, further comprising:
    using the method for address selection in a navigation system, or a mobile terminal.

7. The method as recited in claim 1, further comprising:
    using the method for database queries on a PC or in the Internet.

8. The method as recited in claim 1, further comprising:
    limiting a selection set for each parameter by inputting the characters, the limited selection sets of multiple parameters being linked in such a way that a limitation of the selection set of one parameter limits the selection sets of the other parameters.

9. The method as recited claim 1, wherein compatibility is ensured for the parameters which are finally selected in the course of the concurrent limitation.

10. The method as recited in claim 1, wherein, as a result of the input of one character for one parameter, one or multiple sequential characters are automatically added to resulting character chains of the other parameters when unambiguousness also occurs as a result of the mutual limitation.

11. The method as recited in claim 1, further comprising:
canceling an input of one character, wherein a limitation of a selection set and a completion of a character chain caused by the canceled character being canceled for all parameters.

12. The method as recited in claim 1, wherein possible destinations are displayed in a list when a number of the possible destinations is smaller than a predefined number.

13. The method as recited in claim 1, wherein compatible combinations of a used parameter group are displayed in a list.

14. The method as recited in claim 1, wherein the parameters in a mobile terminal include at least one of an address, a song, an interpreter, an artist, a video title, a photo, an e-mail, a book title, a manufacturer, and a drug.

15. The method of claim 1, wherein the displaying prompts includes not displaying characters that have been eliminated based on the selected candidate elements.

16. The method of claim 1, wherein the displaying prompts includes displaying parameters of the set of the selected candidate elements on a selection area.

17. A computer-implemented method utilizing a destination selection in a navigation system, comprising:
defining, via a processor, each destination out of a totality of destinations by a plurality of parameters;
displaying, via the processor, a plurality of data fields, each data field corresponding to one parameter out of the plurality of parameters, each parameter being specified by a respective string of characters;
inputting, via the processor, a first subset of characters of a first parameter in a first data field, the first subset having fewer characters than a full set of characters of the first parameter;
while the first subset has fewer than the full set of characters of the first parameter, inputting, via the processor, a second subset of characters of a second parameter in a second data field, the second subset having fewer characters than a full set of characters of the second parameter;
while inputting characters in the first and second data fields, selecting, via the processor, stepwise a set of candidate destinations from the totality of destinations based on the first and second subsets of input characters; and
displaying, via the processor, prompts based on the set of candidate destinations.

18. The method as recited claim 17, wherein the parameters in the navigation system include at least one of a country designation, a city name, a street name, a house number, a ZIP code, a telephone area code, and a phone number.

19. A mobile terminal, comprising:
an input device for inputting characters via a plurality of displayed data fields;
a memory in which a totality of elements is stored, at least two parameters being assigned to each element out of the totality of elements, each parameter being input from one displayed data field; and
a controller adapted to:
receive a first subset of characters of a first parameter in a first data field, the first subset having fewer characters than a full set of characters of the first parameter;
while the first subset has fewer than the full set of characters of the first parameter, receive a second subset of characters of a second parameter in a second data field, the second subset having fewer characters than a full set of characters of the second parameter;
while receiving characters in the first and second data fields, select stepwise a set of candidate elements from the totality of the elements, and
display prompts based on the set of candidate elements on the mobile terminal.

20. A navigation system, comprising:
an input device for inputting characters via a plurality of displayed data fields;
a memory in which a totality of elements is stored, at least two parameters being assigned to each element out of the totality of elements, each parameter being input from one displayed data field; and
a controller adapted to:
receive a first subset of characters of a first parameter in a first data field, the first subset having fewer characters than a full set of characters of the first parameter;
while the first subset has fewer than the full set of characters of the first parameter, receive a second subset of characters of a second parameter in a second data field, the second subset having fewer characters than a full set of characters of the second parameter;
while receiving characters in the first and second data fields, select stepwise a set of candidate elements from the totality of the elements, and
display prompts based on the set of candidate elements on the mobile terminal.

21. A driver information system, comprising:
an input device for inputting characters via a plurality of displayed data fields;
a memory in which a totality of elements is stored, at least two parameters being assigned to each element out of the totality of elements, each parameter being input from one displayed data field; and
a controller adapted to:
receive a first subset of characters of a first parameter in a first data field, the first subset having fewer characters than a full set of characters of the first parameter;
while the first subset has fewer than the full set of characters of the first parameter, receive a second subset of characters of a second parameter in a second data field, the second subset having fewer characters than a full set of characters of the second parameter;
while receiving characters in the first and second data fields, select stepwise a set of candidate elements from the totality of the elements, and
display prompts based on the set of candidate elements on the mobile terminal.

* * * * *